US007401050B2

(12) United States Patent
O'Neill

(10) Patent No.: US 7,401,050 B2
(45) Date of Patent: Jul. 15, 2008

(54) METHOD TO IMPROVE DEBT COLLECTION PRACTICES

(75) Inventor: Patrick G. O'Neill, Wilmette, IL (US)

(73) Assignee: Accenture Global Services GmbH, Schaffhausen (CH)

(*) Notice: Subject to any disclaimer, the term of this patent is extended or adjusted under 35 U.S.C. 154(b) by 9 days.

(21) Appl. No.: 10/200,262

(22) Filed: Jul. 22, 2002

(65) Prior Publication Data

US 2004/0015425 A1    Jan. 22, 2004

(51) Int. Cl.
*G06Q 40/00* (2006.01)
(52) U.S. Cl. .......................................... 705/39; 705/35
(58) Field of Classification Search ................ 705/39, 705/35
See application file for complete search history.

(56) References Cited

U.S. PATENT DOCUMENTS

| | | | |
|---|---|---|---|
| 5,889,799 A | | 3/1999 | Grossman et al. |
| 5,963,635 A | | 10/1999 | Szlam et al. |
| 6,041,315 A | * | 3/2000 | Pollin .......................... 705/45 |
| 6,052,674 A | | 4/2000 | Zervides et al. |
| 6,098,052 A | * | 8/2000 | Kosiba et al. .................. 705/40 |
| 6,456,983 B1 | | 9/2002 | Keyes |
| 7,006,994 B1 | | 2/2006 | Campbell et al. |
| 7,191,150 B1 | | 3/2007 | Shao et al. |
| 2001/0044739 A1 | | 11/2001 | Bensemana |
| 2002/0059139 A1 | * | 5/2002 | Evans .......................... 705/40 |
| 2002/0072952 A1 | | 6/2002 | Hamzy |
| 2002/0116245 A1 | * | 8/2002 | Hinkle et al. ................... 705/8 |
| 2002/0123946 A1 | * | 9/2002 | Haworth et al. ............... 705/35 |
| 2002/0188638 A1 | | 12/2002 | Hamscher |
| 2002/0198796 A1 | * | 12/2002 | White et al. .................. 705/34 |
| 2003/0018563 A1 | * | 1/2003 | Kilgour et al. ................ 705/37 |

FOREIGN PATENT DOCUMENTS

WO    WO 01/57756    *    8/2001

OTHER PUBLICATIONS

Zaretsky, Barry L. Setoff strategies for collecting troubled loans, Commercial Lending Review. Boston: Fall 1994. vol. 9, Iss. 4; p. 31.*
Pincetich et al.; Creditors Explore new skip-tracing Strategies as Delinquecies reach Record High, Credit World, Jan.Feb. 1997; 85 p. 35 ABI/INFORM Gloabal.*
Makuch, William M. et al.; Managing Consumer Credit Delinquency in the US Economy: A Multi-Billion Dollar Management Science Application; The Institute of Management Sciences, Jan.-Feb. 1992; pp. 90-109.

(Continued)

*Primary Examiner*—Jagdish N Patel
(74) *Attorney, Agent, or Firm*—Vedder Price P.C.

(57) ABSTRACT

A method of improving debt collection from a debtor acquires pertinent debtor information in real time or near-real-time. Newly acquired debtor information is used in a debt collection decision procedure which determines the appropriate debt collection strategy to use with a debtor based upon the most recently acquired information. A preliminarily used debt collection procedure can be adapted or modified in real time, or on-the-fly, using the most up-to-date information, which is typically best acquired during a debt collection process.

9 Claims, 3 Drawing Sheets

OTHER PUBLICATIONS

Makuch, William; Dodge, Jeffrey; Ecker, Joseph; Granfors, Donna; and Hahn, Gerald, Managing Consumer Credit Delinquency in the US Economy: A Multi-Billion Dollar Management Science Application, The Institute of Management Sciences, Interfaces 22: Jan. 1-Feb. 1992.

Piumelli, Frederick and Schmidt, David, Power Collecting, Automation for Effective Asset Management, John Wiley & Sons, Inc., 1998, pp. 138-241.

Meyer, Paul, Introductory Probability and Statistical Applications, Washington State University, Addison-Wesley Publishing Company, 1965, pp. 12-13, 20-21, 106-107.

European Search Report for International Patent Application No. PCT/US03/22810 dated Aug. 19, 2004.

PCT/US03/26753 WO International Search Report.

Zaretsky, Barry L. "Setoff Strategies for Collecting Troubled Loans", Commercial Lending Review, Fall, 1994, p. 31, vol. 9, Iss. 4, Boston.

Pincetich, Maria and Rubadue, Tom, "Creditors Explore New Skip-Tracing Strategies as Delinquencies Reach Record Highs", Credit World, p. 35, Jan./Feb. 1997, 85, 3.

Cordell, Larry; Jericho Trianna, "Who Pays, Who Delays and Who Strays". Secondary Mortgage Markets; Dec. 1999;16, 2; ABI/INFORM Global p. 8 (6 pages).

"The Score on Behavior Scoring", Credit Union Management. Madison: Jul. 1998, vol. 21, Iss. 7; p. 24 (2 pages).

Taylor, Peter; Robert Sleight, "Achieving Account Management Goals." Credit Card Management Europe, New York, May/Jun. 1994, Vo. 2, Iss. 12; p. 18 (4 pages).

Palla, Ken, "The Potential of Scoring in International Mortgage Lending", Housing Finance International; Mar. 2000; 14, 3; p. 14 (7 pages).

* cited by examiner

METHOD TO IMPROVE DEBT COLLECTION PRACTICES

CROSS REFERENCE TO RELATED APPLICATIONS

The instant application is related to prior, commonly-assigned U.S. patent application No. 09/976,607 entitled "Method to Improve Debt Collection Practices"; Ser. No. 10/011,523 entitled "Improved Debt Collection Practices"; and Ser. No. 10/229,803 also entitled "Method to Improve Debt Collection Practices."

FIELD OF THE INVENTION

This invention relates to the business of debt collection. In particular, this invention relates to a method for improving debt collection.

BACKGROUND OF THE INVENTION

The extension of unsecured credit by banks, credit card issuers and merchants has created an explosion of secured and unsecured consumer debt. Many consumers are indebted well-beyond their ability to pay their debts and, as a result, account balances and even the so-called minimum payments due on their credit accounts become overdue or "delinquent."

Creditors attempt to collect overdue balances and overdue payments using a variety of techniques, also referred to herein as debt collection "strategies." Debt collection strategies can include written correspondence, such as a letter, phone calls, personal visits, negotiations for payment extensions, interest rate adjustments, threats of litigation as well as a combination thereof. By way of example, letters are often followed by telephone calls. Telephone calls may be scheduled for a certain time of day. Whether a communication with a debtor is written or oral, it will comprise a message, which may be threatening or conciliatory. The communication with the debtor is such that payment options may (or may not) be offered, providing varying degrees of flexibility to the debtor to provide payment on the past due account. The contact with the debtor may be handled by collections personnel who are highly trained, experienced employees with excellent negotiating skills, or by relatively inexperienced collectors, with less developed skills. The combination of these and other elements of customer interaction comprise a treatment (also known as a "collection strategy") and each debt collection strategy is intended to yield a result.

The process of debt collection has become sophisticated. Whether a debtor is threatened or consoled, debt collection processes are preferably tailored to a particular debtor reflecting the fact that different people will react differently to the same message or offer. In order to maximize collection efforts, different people should be treated differently, but appropriately for their particular circumstances.

FIG. 1 depicts a simplified representation of a prior art debt collection process 100. Extrinsic or external payment data 102, which is typically collected by and available from third party debt collection data services such as Equifax, Inc., Experian Inc. and others, and includes debtor data such as income, debt-to-income ratio, other creditors and a "credit score" which is usually a dimensionless index calculated by the third party credit reporting agency using a proprietary formula to attempt to rate or grade the credit worthiness of the debtor.

In addition to external data 102, prior art debt collection processes used by many creditors also use internal data 104, which is data on a particular debtor that is collected by a creditor. Internal data 104 typically includes the creditor's payment history, his purchase history and contact history. The payment history 106 typically includes the historical timeliness of required loan or installment payments by a creditor. Payment history data 106 can be valuable in collecting debt if the payment history data 106 shows that a particular debtor is either habitually late or delinquent in making payments, or consistently makes payments on time. Payment history data 106 can be a good indicator of future payment likelihood.

Purchase-history data 108 typically includes data of the business relationship with the debtor over time. A long-time customer evidenced by purchase-history data 108 might be treated differently than a new customer. Accordingly, purchase-history data 108 is frequently considered during a debt collection effort.

Among other things, the external data 102 and internal data 104 for each debtor can be used to classify or characterize a debtor and/or the debtor's ability to pay off a debt. Such data can also be used to select a debt collection strategy likely to be successful with the debtor.

A contact history or record 110 is typically a record of the substance of communications to and from a debtor. Contact history data 110 wherein previous conversations with or correspondence from a debtor contain debtor represent that payments will be forthcoming but which subsequently prove to be false, can be helpful in determining how to collect an existing debt.

A raw credit score 112 is typically a dimensionless index that is calculated using a creditor-proprietary formula or methodology, the resultant numerical value of which provides some sort of measure of the debtor's credit worthiness. A credit score is based upon historical data and relies upon historical data as a predictor of future payment likelihood. Contact history and credit score can also be used to characterize or classify a debtor and/or the debtor's ability to pay off a debt.

In prior art debt collection processes, data that includes the external data 102 and internal data 104 are analyzed alone or in combination, in step 120 in order to determine a risk profile 122 as well as a model of the debtor's behavior 124. The task of collecting all or part of debt is assigned to a debt collector in step 130 based upon the risk profile 122 and behavior model 124 of the debtor.

A problem with prior art debt collection techniques is that they rely upon individual collectors to assimilate this complex array of information and to form judgments as to the most appropriate negotiating strategies or treatment for the customer, very typically in a very short time frame while the collector is engaged in conversation with the customer. In addition, as the customer provides additional information to the collector relative to the customer's financial circumstances or willingness to pay, the collector is expected to immediately reassess treatment strategies, messages to deliver and negotiation tactics. As indicated above, some collectors are highly trained professionals, and better able to perform these complex assessments, while others are newer to the job, and less able to make these assessments.

A method by which a creditor can ascertain the treatment that is most likely to persuade a debtor to make a payment on outstanding debt, to adapt said treatments based on real-time interaction with the customer to maximize the probability of successful negotiation, and to consistently and systematically apply the assessment of treatment strategies relative to the customer across all debt collection interactions, thereby reducing the number of required contacts and the amount of debt charged off, would provide a significant improvement over the prior art.

As disclosed above, the terms "strategy" and "collection strategy" refer to techniques used to collect a debt. Collection strategies can include, but are not limited to, a specification or directive as to when and/or how often a debt collector should contact a debtor, how a debtor should be contacted, e.g., by phone, by mail, in person, whether the delinquent debt payment should be negotiated or perhaps an offer to settle a debt or extend a repayment schedule should be made, and/or the tone and demeanor of the discussion.

Those of skill in the art will recognize that attempting debt collection using a collection strategy based upon only historical data has limitations. If the personal circumstances of a debtor have changed since the information about the debtor was last collected, the selected debt collection strategy might not be appropriate. A method for adjusting a debt collection strategy in real time to accommodate the changing circumstances of a debtor would be an improvement over the prior art.

DETAILED DESCRIPTION OF A PREFERRED EMBODIMENT

Figure 1:
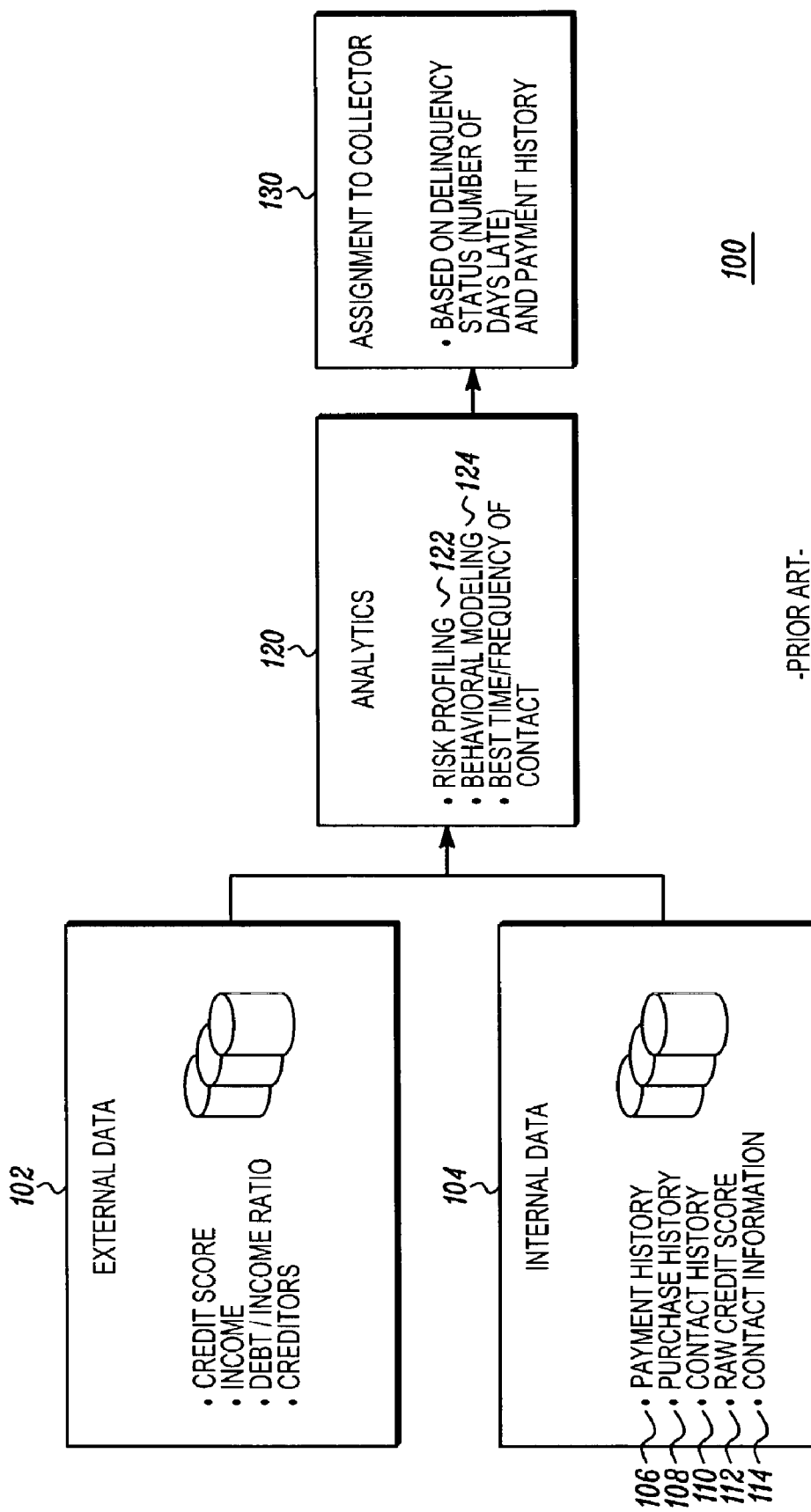
FIG. 1 is a block diagram depiction of a prior art method of collecting debt.
Figure 2:
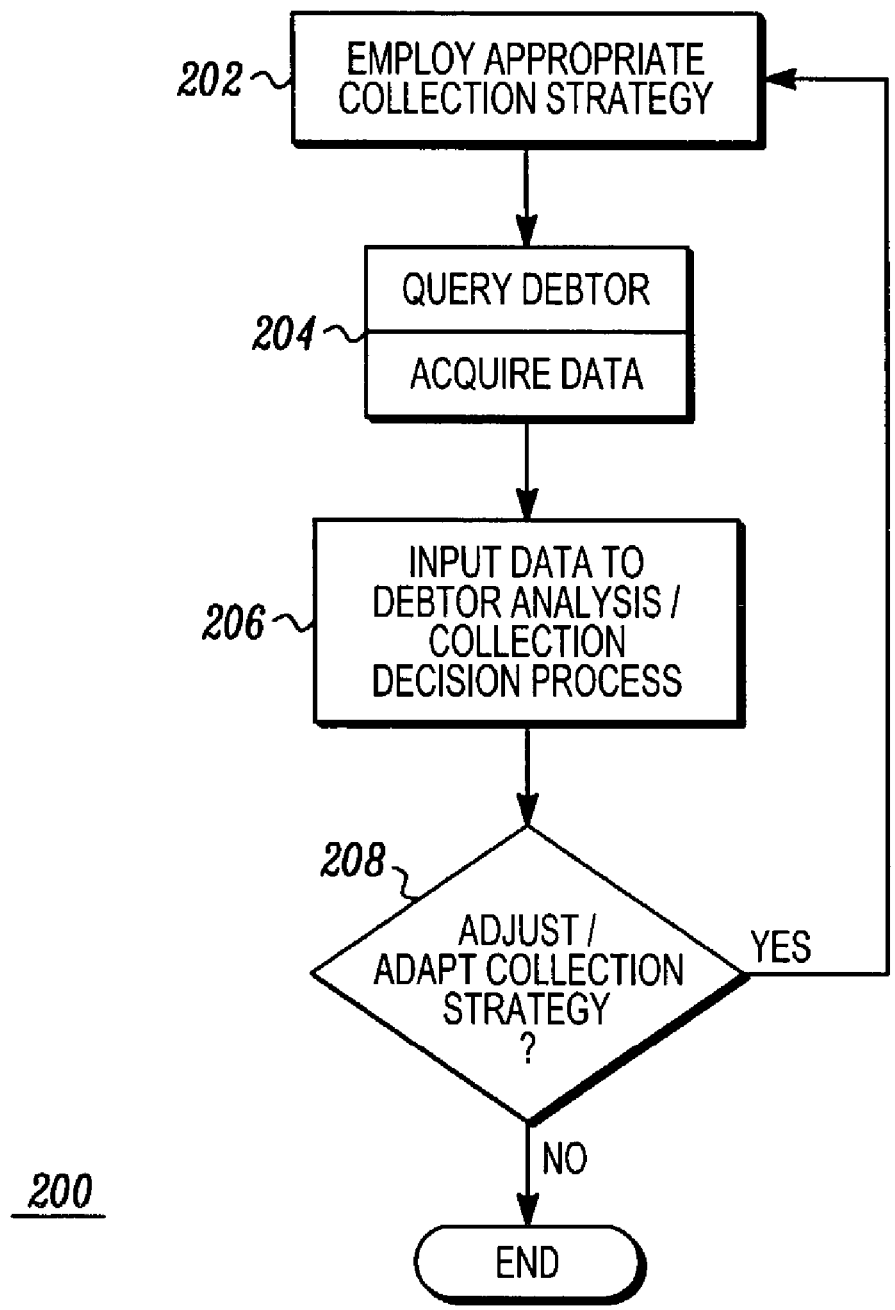
FIG. 2 depicts the steps of a method for adjusting a collection strategy in response to acquired debtor data.

FIG. 2 depicts a flow chart of the steps of a method 200 of improving debt collection from a debtor. The method 200 contemplates that debtors from whom collection is sought, are categorized or classified according to various factors that include the external data 102 and internal data 104 depicted in FIG. 1 and that a particular debt collection strategy has been selected for use (by a debt collector) against the debtor. The method 200 also presumes that once a debtor is classified or categorized, debt collection from the debtor is attempted using a first collection strategy.

Collection strategies can include how to contact a debtor, how often to contact a debtor and a range of suggestions or requests to make of a debtor. Collection strategies can be accompanied by a script for a debt collector to follow. Scripts can include certain types of questions, which can either elicit information about the debtor or elicit a commitment that the debtor will repay a loan.

By way of example, a collection strategy can include telephone contact with the debtor at certain times of the day, requests or solicitations of a promise to pay, the possibility of extending a repayment schedule, the possibility of increased or decreased interest rate over a longer or shorter time period, threats to report a delinquent payment to a credit reporting agency and other steps in order to induce payments. A script for a debt collector can be read to the debtor during a phone call with the debtors' responses recorded by the debt collector into a computer database. The particular parameters of collection strategies are well known in the art, and need not be described in detail here.

In step 202 of the method 200, once an appropriate collection strategy is identified for the debtor, the collection strategy is employed, typically by a collection agent of the creditor. In employing a collection strategy in step 202, the collection agent will frequently be required to contact the debtor and, as indicated in step 204, query the debtor about the debtor's ability to repay. In the course of querying the debtor, in step 204, the collection agent will frequently acquire new information which may be additional or new internal data 104 or new external data 102.

Newly-acquired data, elicited from the debtor during a scripted dialog, can frequently provide valuable information. For example, a recent job loss or a recent job promotion reflects on repayment ability. Data acquired from the debtor in the course of performing a collection strategy can often indicate that a different collection strategy should be used. Obtaining new information from the debtor that is pertinent to the debtor's ability to repay can be selectively used by a debt collector to adjust or adapt a collection strategy in order to improve debt collection. A collection strategy that is modified using such information can be considered to be a second debt collection strategy.

Newly-acquired data acquired in step 204 from a debtor is provided to an analysis/collection decision procedure 206. The debt collection decision procedure 206 determines how to adapt a debt collection strategy to better match the strategy being used to the specific debtor. The debt collection decision procedure 206 uses the data that was acquired during the execution of step 204.

If as a result of the newly acquired debtor data from step 204, it is determined in step 206 that the debt collection strategy employed at step 202 was inappropriate, a decision is made at step 208 to adjust or "adapt" (i.e., modify) the debt collection strategy used for the specific debtor. If a decision is made at step 208 to adapt the debt collection strategy, program control returns to step 202 whereat the adjusted debt collection strategy is employed for the specific debtor. Steps 204 and 206 are shown as being repeated, with additional queries and with possibly additional new data at step 204. If during a re-execution of the method 200, no additional data is acquired at step 204, program control will then proceed to the end of the flow diagram depicted in FIG. 2, and debt collection proceeds according to the collection strategy selected in part, based upon newly acquired information received from the debtor.

Figure 3:
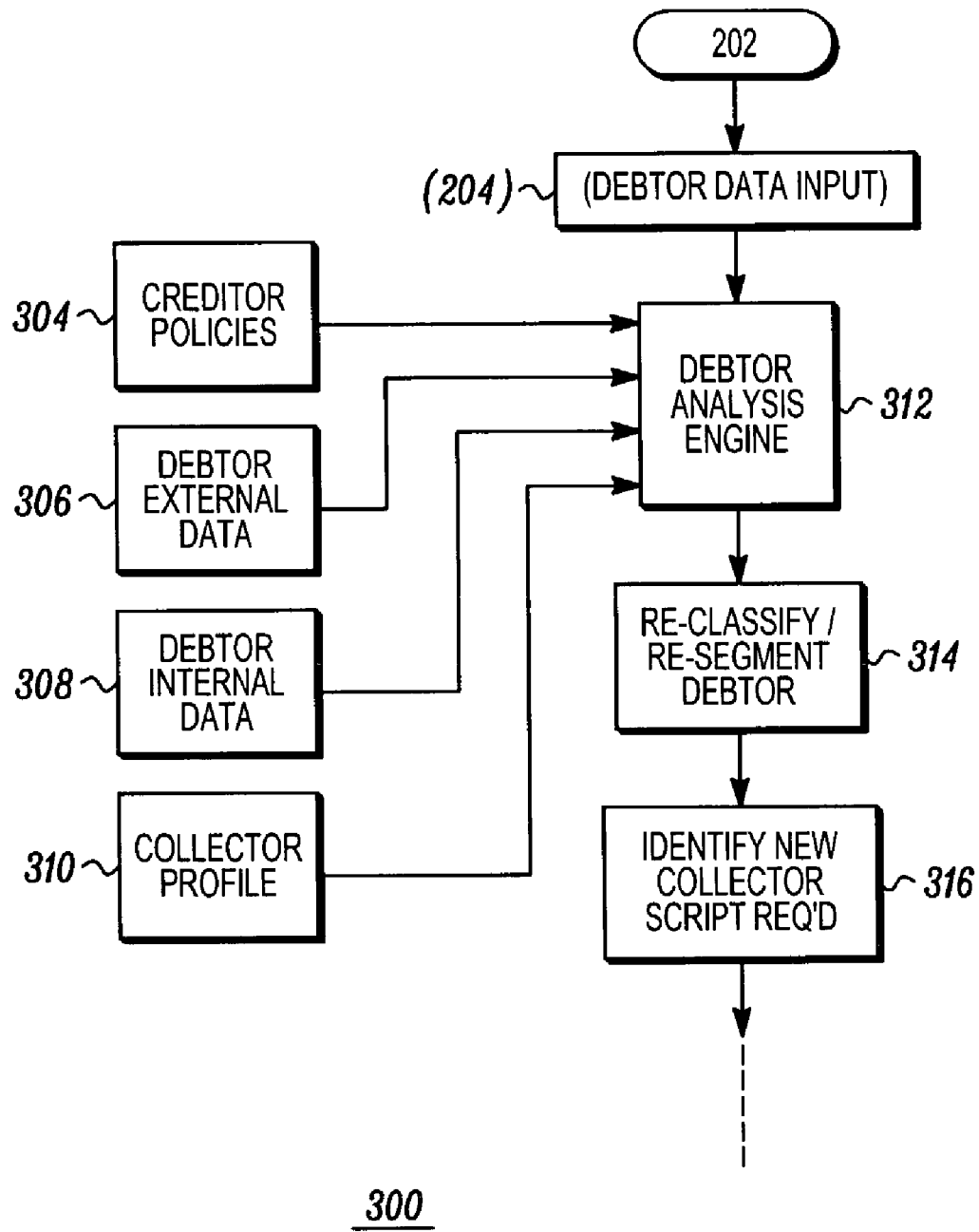
FIG. 3 is a block diagram depiction of a method for a debt collection decision procedure which determines a debt collection strategy to use with a debtor in response to debtor information.

FIG. 3 depicts the steps of a debt collection decision procedure 300, which determines how to adapt a debt collection strategy in response to newly-acquired information. In a preferred embodiment, the decision procedure is performed automatically, e.g., on a computer, however, alternate embodiments would include manually calculating the collection decision procedure 300. Upon the execution of step 204 (as shown on FIG. 2) newly-acquired debtor data is input to a debtor analysis engine 312. The debtor analysis engine 312 can be implemented on a computer (not shown) which executes instructions by which different debt collection strategies are selected for a specific debtor in response to various objective inputs, such as the internal and external data shown in FIG. 1.

The debtor analysis engine 312 automatically determines which debt collection strategy to use with the specific debtor based upon the aforementioned internal and external data, as well as other input data (known as automated decision making). This automatic determination can be realized using any appropriate programming mechanism. For example, look-up tables, multi-element arrays or data structures can be used to select a collection strategy based on several different inputs.

A method of selecting collection strategies is disclosed in pages 4-13 in the commonly-owned, co-pending application Ser. No. 09/976,607 entitled a "Method to Improve Debt Collection Practices," and is incorporated herein by reference. A debt collection selection process disclosed on pages 4-17 of commonly-owned and co-pending application Ser. No. 10/011,523 for "Improved Debt Collection Practices" is also incorporated herein by reference. The debtor analysis engine 312 identifies a particular debt collection strategy to use by employing either rules-based software, neural network evaluative technology, applied analytic models, scrolling and segmentation, or any other decision-making tools, which can determine the most effective collection strategy to employ of potentially several different collection strategies. In some instances, the debtor analysis engine 312 will not identify any change to a collection strategy being used with a debtor. In other words, newly-acquired information will not always trigger selection of another strategy or adaptation of a strategy already being used.

The debtor analysis engine 312 considers factors that include a creditor's credit policies 304, external data of the debtor 306 (identified in FIG. 1 by reference No. 102), debtor internal data 308 (identified by reference No. 104 in FIG. 1), a collector profile 310 (which includes the skill set and experience level of the collector charged with the responsibility for collecting a particular debt from a debtor), and information collected from the debtor at step 204 (shown in FIG. 2). Among other things, the debtor analysis engine 312 will consider past attempts or effectiveness of various strategies used against debtors with similar or identical internal data, external data, creditor policies and collector profiles. Using such historical data, it is possible to predict with reasonable certainty the effectiveness of a particular strategy of particular types of debtors. When one or more pieces of internal data, external data, or creditor policies change, or if the collector ability profile changes, the collection strategy that was previously used may become ineffective. Thus, the debtor analysis engine is able to consider these changes and modify the collection strategy accordingly.

Upon the identification of a debt collection strategy, the debtor analysis engine 312 determines the best interaction treatment for the particular debtor and preferably provides a script or set of scripts to a debt collection agent. Text of a script can be readily stored in random access memory or on disk for retrieval and printing or display on a suitable display device for use by a collection agent. By following a scripted text, questions or statements can be made to the debtor to elicit information pertinent to the debt collection effort. The script can also provide suggestions or verbatim passages to deliver to the debtor either by mail, telephone or during a personal contact. Debtor responses to the script comprise the debtor input at step 204, which is re-input to the debtor analysis engine 312.

At step 314, the output of the debtor analysis engine 312 will identify the appropriate strategy to be used with the debtor and if the strategy has changed since the last execution of the method shown in FIG. 2, the re-classification of the debtor is performed at step 314. Accordingly, a new collection script can be provided in step 316 to be used by a debt collection agent.

Returning to the method 200 shown in FIG. 2, step 208 is executed if the debt collection strategy identified in the method 300 of FIG. 3 is different from that which was previously used. By using new information from the debtor obtained in real-time in the course of attempting debt collection, a debt collection strategy can be adapted or modified to better suit the debt collection process. A creditor can get better results from its debt collection effort by proposing to the debtor a debt collection strategy more well-suited to the debtor as of the time of collection.

Those of skill in the art will realize that the ability to provide real time, feedback during a debt collection process, can enable a debt collector to select a second or alternate debt collection strategy. If a debtor's ability to repay a loan has changed or altered since the information on that debtor was last collected, an ability to revise a debt collection strategy based on real time or near-real-time data collection can increase the likelihood of successful debt collection.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A method for computing a debt collection strategy comprising the steps of:
   determining, by at least one computing device, a first debt collection strategy to collect a debt from a debtor;
   receiving, by the at least one computing device or other computing device, additional information, wherein the additional information is obtained from the debtor during an attempt to collect the debt using the first debt collection strategy;
   executing, by the at least one computing device or other computing device at the time of receiving the additional information, a debt collection decision procedure using the additional information; and
   determining a second debt collection strategy based on the debt collection decision procedure to collect the debt from the debtor, wherein, the first second debt collection strategy is modified based, at least in part, upon the additional information received to provide the second debt collection strategy.

2. The method of claim 1 further including the step of: identifying, by at least one of the computing devices from said additional information, at least a second debt collection strategy to use with said debtor.

3. The method of claim 1 wherein said step of obtaining additional information includes:
   displaying, by at least one of the computing devices, a predetermined debt collection script, which elicits information to be gathered from the debtor.

4. The method of claim 3, wherein the predetermined debt collection script is selected using the first debt collection strategy and revised based on the second debt collection strategy.

5. The method of claim 1 wherein the debt collection decision procedure includes at least one of: rules-based software; use of neural network evaluative technology; application of analytic models; and scoring and segmentation.

6. The method of claim 1 wherein the second debt collection strategy is determined using a debtor analysis engine.

7. A method for computing a debt collection strategy comprising the steps of:
   determining, by at least one computing device, a first debt collection strategy to collect a debt from a debtor, wherein the first debt collection strategy includes a predetermined debt collection script that elicits additional information from the debtor;
   receiving, by the at least one computing device or other computing device, additional information, wherein the additional information is obtained from the debtor during an attempt to collect the debt;

determining, by the at least one computing device or other computing device at the time of receiving the additional information, a second debt collection strategy to use with said debtor, wherein the first debt collection strategy is modified based on the additional information to provide the second debt collection strategy; and generating, by the at least one computing device or other computing device, a revised debt collection script based the second debt collection strategy.

8. The method of claim 7 wherein a predetermined debt collection script is selected using the first debt collection strategy and subsequently revised based on a selection of the secondary debt collection strategy.

9. The method of claim 8 wherein the debt collection decision procedure includes at least one of: rules-based software; use of neural network evaluative technology; application of analytic models; and scoring and segmentation.

* * * * *